(No Model.)
W. HEATON.
ANIMAL TETHERING DEVICE.
No. 283,240. Patented Aug. 14, 1883.
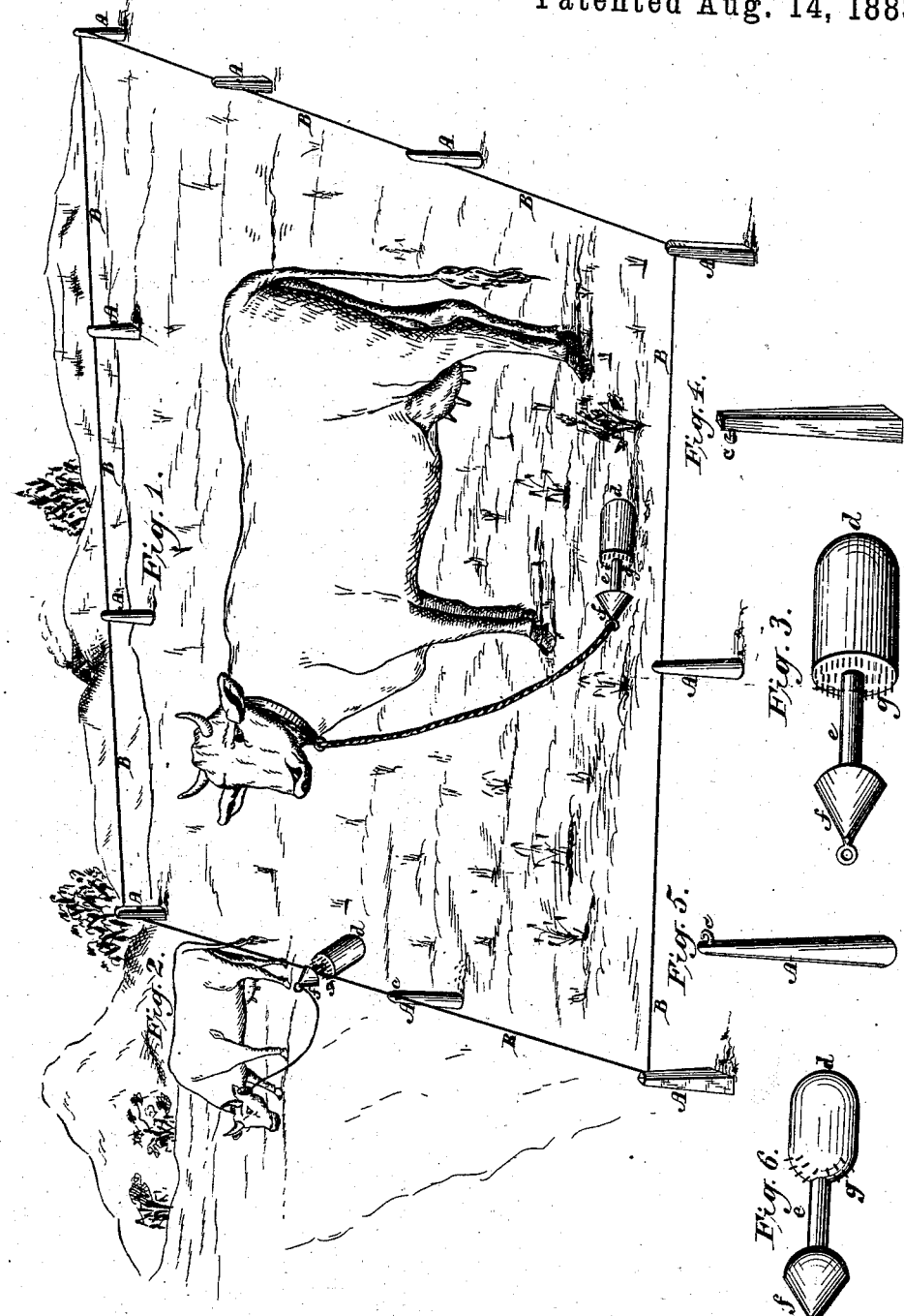
Attest:
E. W. Gallaher
Charles C. Buckley
Inventor:
William Heaton
By John S. Gallaher, Atty.

UNITED STATES PATENT OFFICE.

WILLIAM HEATON, OF LEE, MADISON COUNTY, IOWA.

ANIMAL-TETHERING DEVICE.

SPECIFICATION forming part of Letters Patent No. 283,240, dated August 14, 1883.

Application filed June 16, 1883. (No model.)

*To all whom it may concern:*

Be it known that I, WILLIAM HEATON, a citizen of the United States, residing in Lee township, in the county of Madison and State of Iowa, have invented and made certain new and useful improvements which relate to that class of inventions termed "Tethers" for the confining, securing, and grazing of animals, of which the following is a specification.

In order clearly to distinguish my improvements from such devices or contrivances generally known as "pokes," "hobbles," "shackles," "yokes," "tether-checks," or "block-drags," I designate my improvements the "animal-tether anchor," the object of which is to prevent certain kinds of the larger farm and the smaller domestic animals from wandering, ranging, grazing, and feeding beyond prescribed bounds of large fields and limited inclosures.

In the accompanying perspective drawings is shown the form of an ordinary limited inclosure by means of short driven stakes provided with hooks or staples, to which is attached a suitable wire or rope, within which inclosure is represented by Figures 1 and 2 two animals of the cow kind with the anchor device hitched to them. Fig. 3 represents a longitudinal view of the peculiar anchor device detached from the animals. Figs. 4 and 5 represent enlarged views of the stakes and hooks or staples. Fig. 6 represents a modified form of the anchor device.

Without entering into any detail description or recital of the special advantages, or specifying in full the particular localities where my said improvements are best adapted, I will merely refer to the device I term the "animal-tether anchor," which is shown in the perspective drawings as attached by suitable rope to the collars of two animals.

Fig. 3 represents the anchor detached. Said anchor should be constructed of suitable well-seasoned tough, hard wood, the butt-end *d* varying from four to eight inches in diameter, round in shape, and about eight or ten inches in length, the end rounded off, or somewhat semi-spherical, as shown at *d*. To the butt-end is attached, or formed therewith, a cylindrical extension or neck-like continuation, *e*, from one to two inches diameter and from four to eight inches long, according to size and strength desired. This neck-like extension *e* terminates in an arrow-like head or short cone-shaped end, *f*, about four or five inches long, and its base or broader part should be slightly less in diameter than the butt-end, so as not to rub or wear against the ground. Into the point of the cone is inserted a suitable hook, staple, or ring for attaching the tether, and into the front end of the butt are inserted securely a sufficient number of small tines or pins of metal, *g*, Fig. 3, about one-fourth of an inch diameter, and projecting about half an inch from the surface of the wood. The pins or tines *g* should not be inserted too thickly, but about an inch apart, and their ends rounded off, so as not to prick or stick into any substance.

Fig. 6 represents a modification of construction, showing the butt-end more in spheroidal form, with the tines or pins inserted somewhat obliquely.

The application and use of my animal-tether anchor is by collar or halter attachment around the head or neck of the animal, when of the larger species—such as horses, mules, and cattle, sheep, and deer—and in cases of vicious horned cattle around one or both horns, or provided, if necessary, with rings inserted in the horns. In no case must the tether or rope connection be so long as to drag or strike against the animal's hind legs or feet. The tether should be merely long enough to permit the anchor to barely rest lightly on the ground, and so that in cases of tall animals the anchor will stand or rest on its butt-end and be moved readily by the animal, so as to permit freedom and ease of movement, without strain or flexure of the neck or body, in ranging or grazing at will anywhere within the limits of the prescribed bounds or inclosure.

My animal-tether anchor can be used on smaller animals—such as dogs, swine, and young calves—as also on fowls—such as geese, turkeys, ducks, and even brooding hens—in all of which cases the anchor must be properly proportioned in size and weight, and when used on fowls the tether must be attached to one leg, and not over three feet long. The pens or inclosure for fowls need not be over ten or twelve inches high, and formed of several wires, as may be required.

Unlike all such devices as log drags, heavy blocks, or weights, the utility and operation of my animal-tether anchor does not require nor depend on weight or undue size, both of which are objectionable, injurious, as well as torturing to the animal attached to such contrivances heretofore in use; but it is the peculiar and novel mechanical form of construction of my improvements which affords advantages and benefit so desired, but not found in devices heretofore used for the same purpose.

For durability my animal-tether anchor may be made of cast or wrought metal of suitable size, without too much weight, and in proportion relative to its particular use.

The operation of my improvements in its use is as follows: The perspective drawings represent a cow, Fig. 1, standing erect within an inclosure, the tether or rope extending from the animal's collar, attached to the anchor on the ground. The small cow, Fig. 2, in the distance is represented as on the outside of the inclosure in the act of grazing, where she can go no farther than the length of her tether, for it will be observed that the anchor $d\ e\ f$ has caught or hooked onto the wire B, the neck-like extension $e$ bearing close against or engaging with the wire B, while the arrow or cone-like head $f$ rests upon and engages also with the wire B, and as the animal pulls the tether the hitch or stop of the animal is more effectually made by the tines or pins $g$ hooking onto the wire B. Thus the cow, Fig. 2, is held securely from escaping, but can readily return, by jumping or stepping back over the wire B, into the inclosure, when the neck, head, and pins $e\ f\ g$ all readily disengage from the wire B, the anchor dropping down on the inside of the inclosure, thus freeing the animal from the hitching, and permitting grazing and free movement within the prescribed inclosure.

The object of the arrow or cone-shaped head $f$ is to press down in the form of a furrow the grass in grazing, so as to permit the butt-end $d$ to move forward unobstructedly, and to prevent any grass or other matter from choking or clogging the pins or tines.

I am aware that so-called "animal-tether anchors" of heavy masses of iron and of wood attached to tethers have long been known and used to some extent; but in their use the operation thereof and the securing of the attached animal depended almost wholly on the weight or ponderosity of the anchor; hence undue and serious strain on the animal hitched to and using such unwieldly attachments.

Having given a full, clear description of the exact construction, application, and the several uses of my so-called "animal-tether anchor," and represented the same by accurate drawings, what I claim as new and useful, and desire to have secured by Letters Patent of the United States, is—

1. An animal-tether anchor constructed or formed with a larger or butt-end part, $d$, neck or stem like extension $e$, terminating with an arrow or cone-like head, $f$, and the butt-end provided with pins or tines $g$, substantially as shown, described, and for the purposes set forth.

2. The improved tether-anchor $d\ e\ f\ g$, with a suitable hitching rope, halter, or chain, in combination with inclosing-posts A and wire B, substantially as and for the purposes set forth and described.

WILLIAM HEATON.

Witnesses:
 B. F. WISE,
 E. H. KRIDLER.